United States Patent [19]

Hiemer et al.

[11] 4,008,990
[45] Feb. 22, 1977

[54] MOLD PIVOTING MECHANISM

[75] Inventors: Armin Alexander Hiemer, Unterreitnau; Siegfried Hermann Jäger, Lindau, both of Germany

[73] Assignee: The Upjohn Company, Kalamazoo, Mich.

[22] Filed: Mar. 26, 1975

[21] Appl. No.: 562,165

[30] Foreign Application Priority Data

Apr. 1, 1974 Germany .......................... 2415703

[52] U.S. Cl. .............................. 425/454; 425/812
[51] Int. Cl.² ......................................... B29B 1/16
[58] Field of Search .............. 425/453, 434, 450.1, 425/450.9, 451, 451.2, 451.3, 451.4, 451.5, 451.6, 451.7, 451.9, 452, 453, 454, 439, 425, 812; 249/137, 138; 264/297

[56] References Cited

UNITED STATES PATENTS 3,595,303  7/1971  Ponting ............................ 425/453

FOREIGN PATENTS OR APPLICATIONS 2,025,580  12/1971  Germany .......................... 425/451
2,012,778  11/1970  Germany .......................... 425/451

*Primary Examiner*—Richard B. Lazarus
*Attorney, Agent, or Firm*—St.Onge Mayers Steward & Reens

[57] ABSTRACT

The present invention relates to a pivoting mechanism for a mold in a system for producing foamed materials, especially polyurethane foams, wherein the molds to be filled by the foam travel continuously around an endless conveyor track and wherein each mold carriage includes a closing portion (mold holder) embracing said mold and comprising an upper closing portion and a lower closing portion, whereby each mold upon being filled is closed by bringing together said upper and lower closing portions, whereupon said mold is pivoted into an inclined position together with said closing portion in order to allow venting of the mold to occur while the mold assembly continues to advance along the conveyor track.

8 Claims, 6 Drawing Figures

Fig. 3
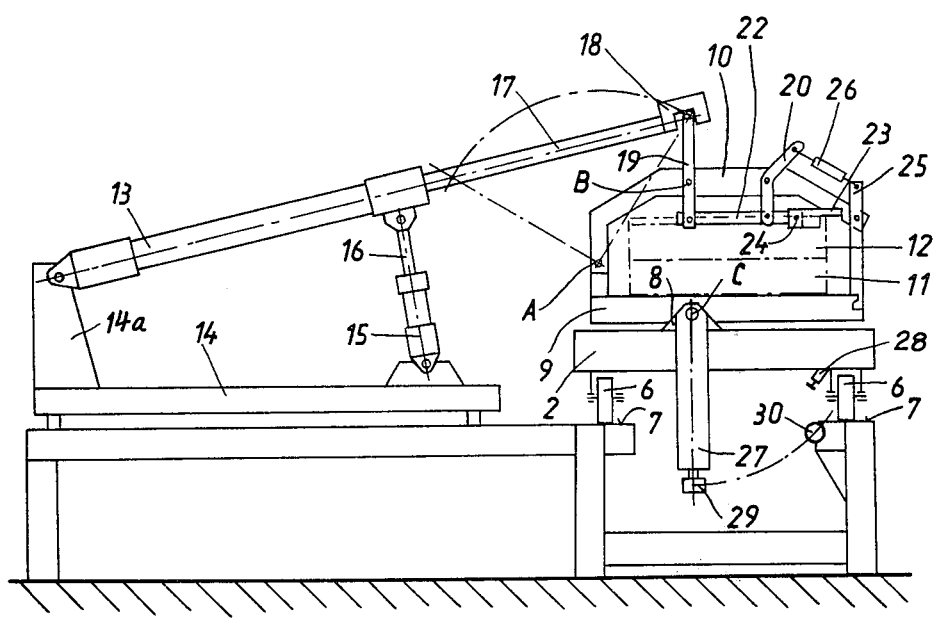
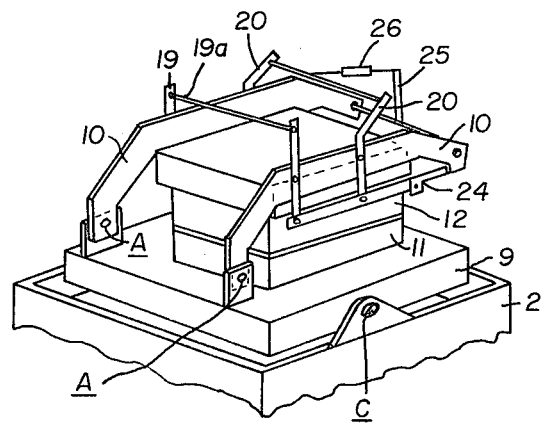
Fig. 6

MOLD PIVOTING MECHANISM

BACKGROUND OF THE INVENTION

In the production of shaped articles from foam materials, the foam-forming substance is poured into a mold which must then be closed very quickly before the foam develops and swells out from the mold. Further, in order to avoid the formation of air pockets within the shaped foam articles, it is expedient that the mold to be filled by the foam is pivoted into inclined position such that after the filling an air outlet in the mold is in as high as possible a possible position. The mold is held in this inclined position until the foam material is cured.

Endless conveyor tracks are known on which mold carriages supporting the molds to be filled by the foam are adapted to travel around. At a filling station, an operator takes care of the pouring of the substance, of the closing of the mold and of the subsequent pivoting of the mold into the inclined position required for ventilation.

This manually operated system suffers from various drawbacks. On the one hand, the velocity of circulation of the mold carriages is limited due to the manual operations, and, on the other hand, problems arise from the fact that closing of the mold as well as the subsequent pivoting thereof must be effected within a minimim period of time (about 5 seconds) while the foam material is still in a liquid state, i.e. before this material has started to develop foam.

It is the object of the present invention to modify known systems of the above-indicated type by providing a mold assembly operating mechanism which acts in such a manner that the steps of closing the molds as well as the subsequent pivoting thereof are performed automatically within an extremely short period of time.

According to the present invention, this object is achieved by providing a pivoting cylinder which along with its piston rod is adapted to be moved into and out of engagement with said upper closing portion by means of a lifting cylinder, and which pivoting cylinder alone provides for the closing of all closing portions when its piston rod is extended, and for the subsequent pivoting of all closing portions when its piston rod is retracted. Said pivoting cylinder and said lifting cylinder are mounted on a movable support adapted to be moved to and fro along a predetermined portion of said conveyor track and to travel together with said mold carriages in the direction of conveyance as long as said piston rod of said pivoting cylinder is engaged with said closing portion. A self-locking interlock or automatic lock is provided between upper and lower closing portions in order to prevent opening of said closing portion during the pivoting thereof. Said closing portion further includes a latch level which, when the inclined position is reached, enters into a guide track provided along said predetermined portion of said conveyor track thereby to prevent said closing portion from swinging back into the horizontal position when said closing portion and said piston rod of said pivoting cylinder have been disengaged from each other. Movement of said piston rod of said pivoting cylinder is stopped when the desired inclination of said closing portion including the mold enclosed thereby is attained.

By an arrangement using only one pivoting cylinder, an extremely simple mold assembly operating apparatus is provided which, in cooperation with the self-locking interlock (automatic lock) between the upper closing portion and the lower closing portion (mold holders) in substantially one operation first closes the closing portion thereby to close the mold, and thereafter brings both parts into the desired inclined position. To this end the piston rod of the pivoting cylinder is engaged with the initially open upper closing portion, and a corresponding control means effective upon filling of the mold causes the piston rod of the pivoting cylinder to be extended until upper and lower closing portions are locked. The subsequent retract movement of the piston rod into the pivoting cylinder thereupon produces the torque which moves the closing portion into the inclined position. As the piston rod of the pivoting cylinder need be engaged with the upper closing portion but once, whereupon closing and pivoting of the closing portion is effected by a single extension and subsequent retraction of the piston rod, it becomes possible to effect these two motions not only automatically, but also within the required short period of time. The lock lever in combination with the guide track ensures that the closing portion, upon reaching the inclined position, is maintained in this position as the mold is thereafter advanced along the track until the foam material is cured. As the pivoting cylinder is no longer needed for maintaining the inclined position of the mold carriage once the guide track is engaged, it may be released from engagement with this closing portion and returned for operating the closing portion of the next mold carriage. In order to effect this disengagement in an easy manner, the retraction of the piston rod into the pivoting cylinder is interrupted as soon as the desired inclination of the closing portion has been reached, and the pivoting cylinder is then raised out of engagement with the closing portion by means of the lifting cylinder.

In an advantageous embodiment of the invention, it is contemplated that the pivoting cylinder and the lifting cylinder are adapted to travel to and fro across a predetermined path or distance of the conveyor track and to move in synchronism with the mold carriages in the direction of conveyance as long as the piston rod of the pivoting cylinder is engaged with a closing portion. As the pivoting cylinder moves along the endless conveyor track at the same velocity as the mold carriages while it closes and thereafter pivots the closing portion, the mold carriages are allowed to continuously travel around the endless conveyor track without having to be stopped at the filling, closing and pivoting station.

Another embodiment of the present invention is characterized in that said lower closing portion is mounted for rotation about a first horizontal axis on said mold carriage; said upper closing portion being connected to said lower closing portion for rotation about a second horizontal axis extending parallel to said first axis; said pivoting cylinder being mounted on a support for rotation about a third axis extending in parallel with said first and second parallel axes; and said lifting cylinder being mounted to said support with said piston rod of said lifting cylinder being affixed to said pivoting cylinder.

In an advantageous further embodiment of the present invention, the front face of each upper closing portion has provided thereon a pair of first levers, one at each side, opposing said pivoting cylinder, which levers are interconnected by means of a rod, a pipe or the like. The head of said piston rod of said pivoting cylinder is formed with a U-shaped configuration so as to be adapted to engage said rod or the like.

Additionally, a further advantageous embodiment is characterized in that both end faces of each upper closing portion have pair of bell cranks, one being pivotally mounted at each side of the mold carrier, opposing said pivoting cylinder, whereby said first lever and said bellcrank are coupled with each other by means of a guide bar. A latch lever is being pivotally mounted at the side of said upper closing portion opposite from said pivoting cylinder said latch lever being connected to said bellcranks by means of a connecting rod which is pivotally mounted at both ends thereof and the lengths of which is variable.

According to the present invention, the automatic lock is provided in a simple manner in that a pawl is pivoted near the end of each guide bar remote from the pivoting cylinder, which pawl cooperates with a stop point or detent in order to prevent the lock from being released.

Preferably, the angle of inclination of the mold holder is adjustable to 60°, which adjustment is effected in ready manner in that the lock lever is secured to the lower closing portion in such a way that its inclination relative to the lower closing portion is adjustable. However, any desired angle of inclination may be set.

In another advantageous embodiment of the present invention, movement of the piston rod of the pivoting cylinder upon reaching the desired inclination of the mold holder and the enclosed mold members is controlled by a limit switch adapted to be actuated by the lock lever.

In the following, an exemplary embodiment of the present invention is described in greater detail by referring to the accompanying drawings, wherein:

FIG. 3 is a schematical view of the present pivoting apparatus at the moment of closing the mold;

FIG. 6 is a fragmentary perspective view showing the lever arrangement adapted to be engaged by the pivoting cylinder to close and latch the mold and to tilt the mold assembly to inclined position.

Figure 1:
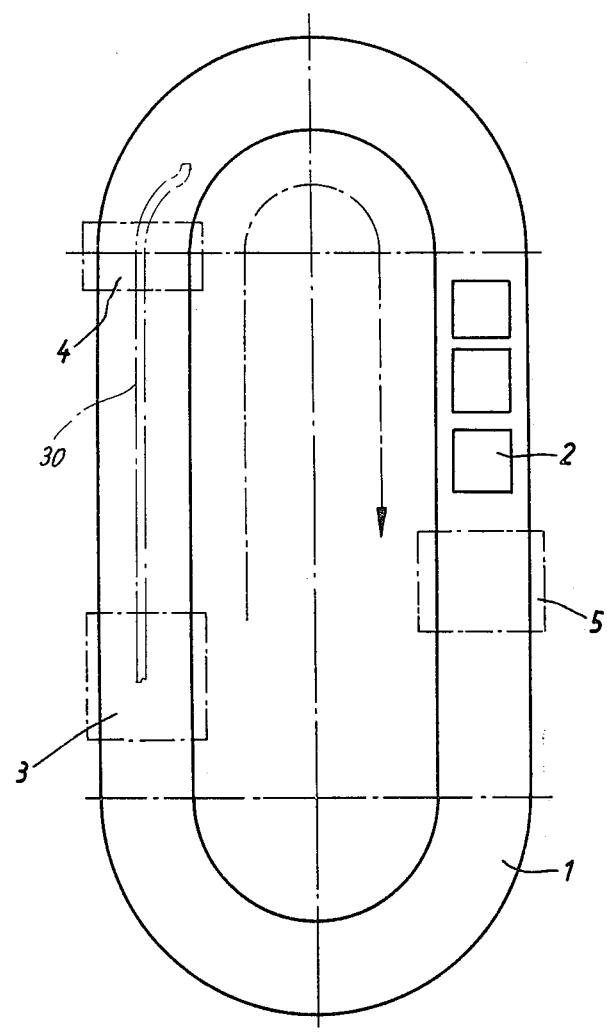
FIG. 1 is a schematical plan view of a system in which the pivoting mechanism according to the present invention may be employed.

In FIG. 1, endless conveyor track 1 is of oval configuration in the illustrated embodiment. On this conveyor track, mold carriages 2 travel around at constant speed and without interruption. The mold carriages support the complementary halves of the molds to be filled by the foam, which molds are supplied with the foaming substance, e.g. polyurethane, at a filling, closing and pivoting station 3. Upon filling, the molds are first locked closed at this station 3 against the opening pressure which is thereafter exerted upon the complementary mold members by the developing foam. The closed mold is then pivoted into an inclined position, preferably under an angle of 60° to the horizontal, in order to move the air outlet (vent) into a high position and thereby avoid the formation of air pockets within the foam material. When the mold carriages leave the filling, closing and pivoting station 3, the molds are retained in their inclined positions along a path having a length approximating that needed to give the necessary period of curing of the foam material. At the end of this path, the molds are swung back into the horizontal position at a return station 4. Subsequently, the molds are opened upon arrival at an opening station 5, and the foam material is discharged from the molds. The mold carriages 2 including the emptied molds are thereafter returned to the filling, closing and pivoting station 3.

Figure 2:
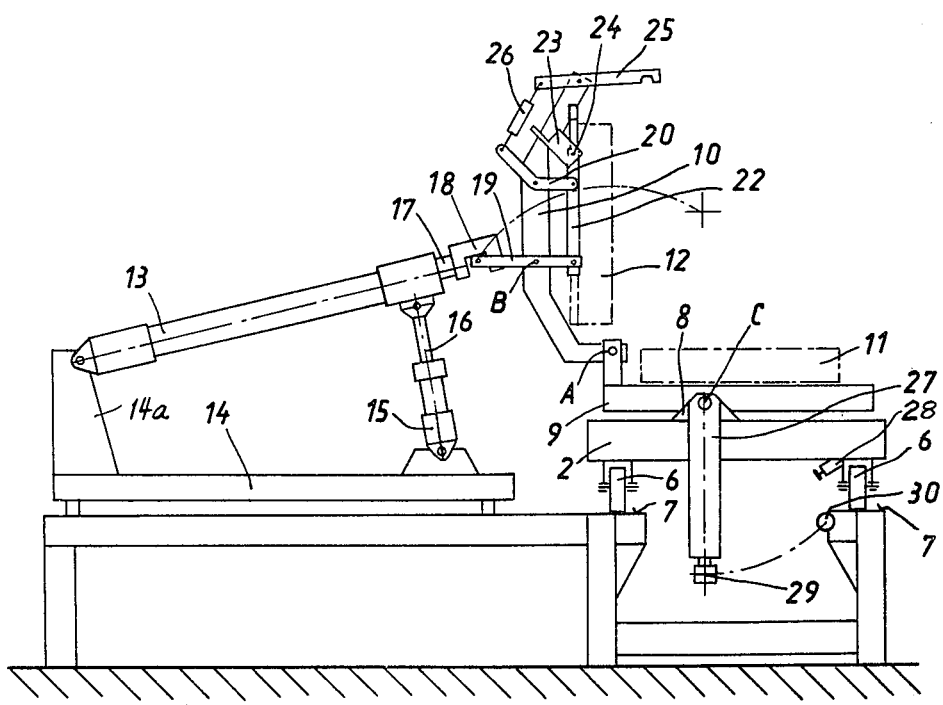
FIG. 2 is a schematical side elevational view of the pivoting apparatus according to the invention in the state of filling the mold.

FIG. 2 shows a front end view of a mold carriage 2 which is trained for travel on track surfaces 7 of the endless conveyor track 1 with the aid of wheels or rollers 6. Flanges 8 on both end faces of the mold carriage 2 mount a lower closing portion (mold holder) 9 for rotation about a horizontal axis. On one side of the lower closing portion 9, an upper closing portion (mold holder) 10 is mounted for rotation about a horizontal axis A extending in parallel with the axis C of rotation of the lower closing portion 9. The complementary mold members comprising the mold base 11 and the mold head 12 are retained in the lower closing portion 9 and in the upper closing portion 10, respectively, and this mold is closed by swinging the upper closing portion 10, shown in a vertical position in FIG. 2, into a horizontal position over an angle of 90° in clockwise direction.

In order to produce this swinging motion serving to close the mold head 12 relative to mold base 11 after the filling of the mold, there is provided a mold assembly operating mechanism comprising a pivoting cylinder 13, e.g. a hydraulic cylinder. The pivoting cylinder 13 has one end thereof connected to a support or bracket 14a on a movable carriage 14, and this cylinder is pivotable around a horizontal axis extending in parallel with the axes C and A of rotation of lower and upper closing portions 9 and 10, respectively. Likewise mounted on the support 14 is a lifting cylinder 15, the piston rod of which is articulated to the pivoting cylinder 13. The pivoting cylinder 13 has a piston rod 17 including a head 18 which has a U-shaped configuration and which may be brought into engagement with a tie rod 19a joining paired levers 19 of the upper closing portion 10 in order to close and thereafter pivot the mold assembly on its carriage In the initial or starting position, the piston of the pivoting cylinder 13 is at its lower dead center, while the piston, and thus the piston rod 16, of the lifting cylinder 15 is extended. Now, when a mold carriage 2 arrives at the filling, closing and pivoting station 3, whereby the upper closing portion 10, as shown in FIG. 2, is vertical, the head 18 of the piston rod 17 of the hydraulic cylinder 13 is in a position above and out of engagement with tie rod 19a of levers 19 and thus the mold. Lifting cylinder 15 which is preferably a pneumatic cylinder, is then operated so that the pivoting cylinder 13 is swung downwards whereby the head 18 of the piston rod 17 is engaged with tie rod 19a of a levers 19 of the upper holder 10. At the same time, the lifting cylinder 15 is deactivated so as to be driven, without exerting a force by itself, during the following movements. The piston rod 17 of the pivoting cylinder 13 is then extended to the upper dead center of the piston thereby to produce, by a pressure exerted against tie rod 19a of levers 19, a torque about the axis A of rotation of the upper closing portion 10 whereby the latter, then, swings into its horizontal (closed) position as shown in FIG. 3. The stroke of the piston rod 17 is selected such that the mold holders 9, 10 are just locked when the piston of the pivoting cylinder 13 reaches its upper dead center.

When the piston rod 17 of the pivoting cylinder 13 has reached the position shown in FIG. 3, and thereby closed mold holders 9, 10, the desired inclination of the mold to be filled by foam is obtained by retraction of the piston rod 17. In order to prevent the mold from being re-opened when the piston rod 17 is retracted, by returning the upper mold holder 10 into the position shown in FIG. 2, a self-locking interlock (automatic lock) is provided between the upper and lower mold holders 10 and 9, respectively. Advantageously, this automatic lock at the same time serves to prevent opening of the mold holders and thus of the mold, under the pressure exerted on the mold by the developing foam. This lock assembly is formed by the lever 19 and a bellcrank 20 both of which are pivotally connected to a slide or guide bar 22 which is reciprocally mounted adjacent the upper edge of upper mold holder 10. At the side opposite from the axis A of rotation of the upper closing portion 10, a latch lever 25 is also pivoted to the upper closing portion, said latch lever being formed so as to engage with a corresponding counterpart on the lower closing portion 9, whereby upper and lower closing portions 10 and 9, respectively, are tightly held against each other. The latch lever 25 is connected to the angled leg of the bellcrank 20 through a connecting rod 26 the length of which is variable. The lower ends of the lever 19 and of the bellcrank 20 are pivoted to a common guide bar 22 mentioned above which has a pawl 23 rotatably mounted to one end thereof.

When the piston rod 17 is extended from its position shown in FIG. 2, a torque around point A resulting in the closing movement of the upper closing portion 10, as well as a torque around point B are produced, which latter torque results in rotation of the lever 19, of the bellcrank 20 and, through the connecting rod 26, of the latch lever 25. The dimensions and the arrangement of the individual elements of this lock assembly are selected such that the latch lever 25 engages into a counterpart provided on the lower closing portion 9, at the instant the upper closing portion 10 reaches the horizontal (fully closed) position. In this position of the guide bar 22, the pawl 23 likewise swings into a horizontal position by gravity so as to engage an adjustable abutment or stop point or detent 24. In this manner, movement of the guide bar 22 and, thus, opening of the lock is prevented.

The pawl 23 may have an arm, not illustrated in the Figures, which arm extends beyond the edge of the upper closing portion 10 and which at the opening station 5 strikes a corresponding guide or cam element, whereby the pawl 23 is raised and the automatic lock is released in order to open the members 9, 10.

Figure 4:
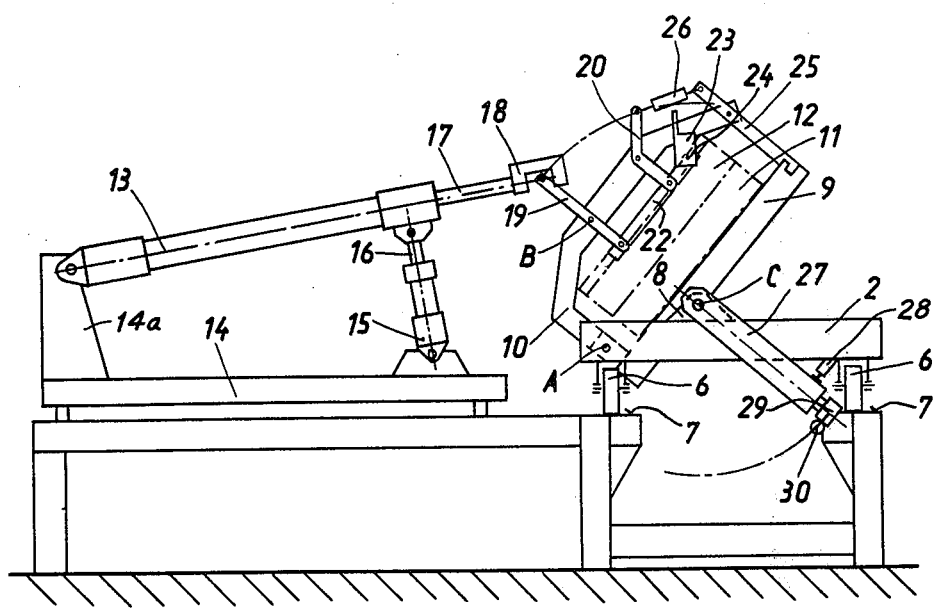
FIG. 4 is a schematical side elevational view of the present pivoting apparatus at the moment of pivoting the closed mold.
Figure 5:
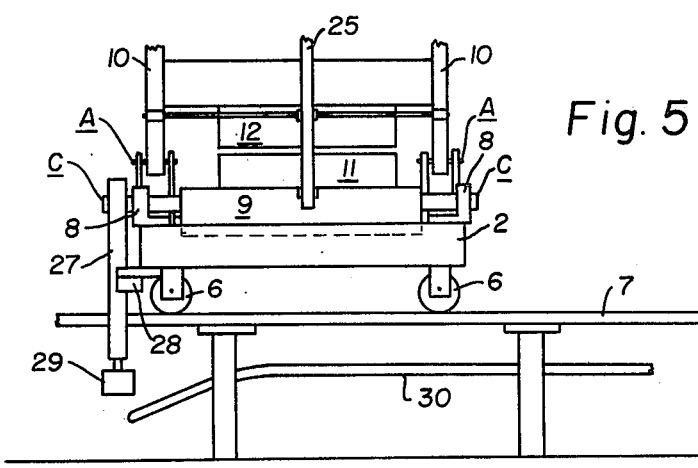
FIG. 5 is a fragmentary and elevational view of a mold carriage and mold holder tilting arrangement.

When the automatic lock is engaged, the members 9, 10 and the mold retained thereby may be moved into the desired inclined position by retracting into the pivoting cylinder the piston rod 17 the head 18 of which, as before, is in engagement with the lever 19. This movement of the piston rod 17 produces a torque around point C (axis of rotation of the lower closing portion 9). This operation becomes apparent from a comparison between FIGS. 3 and 4.

As a single pivoting cylinder is provided for all of the mold carriages 2 or closing portions 9, 10, respectively, which travel around the endless conveyor track 1, the head 18 of the piston rod 17, upon reaching the desired inclination of the mold must be disengaged from the latter and engaged with the next mold holder. However, in order to maintain the inclined position of the mold holder or of the mold held therein, respectively, even after release of the interlock with the piston rod 17, the lower closing portion includes a lock lever 27 which extends downwards into the endless conveyor track. This lock lever 27 is secured to the lower closing portion 9, e.g. by means of a pair of interlocking conical members, in such a way that, although the connection is rigid, the inclination of the lock lever 27 relative to the lower closing portion 9 may be adjusted as desired. Preferably, this inclination is set such that a pivot angle of 60° results. The lower end of the lock lever 27 carries a roller 29 which is raised by the pivotal movement onto a guide track 30 so as to ride on this guide track and thereby to prevent swinging back of the closing portion into the horizontal position when the piston rod 17 has been disenganged from the lever 19 of the upper closing portion 10. The start of track 30 is located at filling, closing and pivoting station 3 (FIG. 1) and the track extends forwardly parallel to track 1, terminating at station 4 which is positioned a predetermined distance from station 1 sufficient to effect the desired interval of inclined orientation of the mold assembly to properly vent the mold. It is apparent that, with a given guide track 30, variation of the inclination of the lock lever 27 relative to the lower closing portion 9 results in a corresponding variation of the angle of inclination of the closing portion.

A combined resilient stop and limit switch 28 may be provided for the roller 29 or for the lock lever 27, respectively, in order to resiliently cushion the pivotal movement of the closing portion on the one hand, and in order to actuate a switch or the like at the point of contact with the lock lever 27 or with the roller 29, respectively, on the other hand, which switch stops the retraction of the piston rod 17 into the pivoting cylinder 13. In this manner, it is rendered possible to pre-set the desired inclination solely through the variable position of the lock lever 27. Besides, the piston rod 17 is relieved by the interruption of its movement such that it may be raised by means of the previously deactivated lifting cylinder 15, and disengaged from the lever 19 of the upper closing portion 10.

During the extremely short period of time (about 5 seconds) in which the closing portion must be closed and thereafter pivoted after the filling of the mold, the support 14 moves together with the mold carriages 2 at the same velocity as the latter. When the inclined position of the mold holder has been attained and the head 18 of the piston rod 17 is disengaged from the lever 19 of the upper closing portion 10, the interrupted retracting movement of the piston rod 17 into the pivoting cylinder 13 is resumed until the lower dead center of the piston rod is reached, and the support 14 is·simultaneously returned into its original or starting position such that, then the head 18 of the piston rod 17, by again lowering the piston rod 16 of the lifting cylinder 15, can be engaged with the lever 19 of the next upper closing portion 10. These operations can be controlled by correspondingly positioned limit switches adapted to be actuated bu the roller 29 or by the lock lever 27, respectively.

We claim:

1. A continuously moving molding apparatus having provision for pivoting the molding members thereof to inclined position for venting purposes, comprising:

endless track means, carriage means trained for travel along said track means, and means for advancing said carriage means continuously along said track means;

a mold assembly on said carriage means, said assembly comprising pivotally joined upper and lower mold holding portions and complementary mold head and mold base, respectively, supported therein for movement between open and closed relation, and means mounting said mold assembly for pivotal movement as a whole relative to its carriage;

lever means on said upper mold holding portion for pivoting it relative to said lower portion and for simultaneously latching said portions in closed relation;

a movable support disposed laterally of and movable parallel to a predetermined portion of said endless track means for reciprocation between the limits of said predetermined portion, said support having means for causing it to travel together with said carriage means as it advances continuously along said predetermined portion of said track and, upon reaching the forward limit of said track portion, for causing it to return to the rearward limit thereof;

a mold assembly operating mechanism, fixed to said movable support, for both closing and automatically locking said mold holding assembly and also for tilting it to inclinded position relative to its carriage, said operating mechanism comprising a pivoting cylinder and piston rod movable between retracted and extended positions in said cylinder, and having means at its free end for engaging said lever of said upper mold holding portion;

means causing said free end of said piston rod to engage said lever means when said mold holding portions are in open position and for pivoting them to and laching them in closed position on extension of said piston rod, and subsequently tilting said mold assembly as a whole relative to its carriage upon retraction of said piston rod, whereby to orient the mold assembly in inclined position for venting;

means for engaging and disengaging the free end of said piston rod from said upper mold holding portion lever; and means for retaining said mold assembly in inclined position as said carriage advances continuously along said predetermined portion of said endless track after disengagement of said piston rod from said lever, whereby to allow venting of the mold to occur.

2. The apparatus as defined in claim 1, wherein said mold holding portions are pivoted about a first horizontal axis on said mold carriage for movement between their open and closed positions; said mold holding assemby is pivoted about a second axis parallel to said first axis, for pivotal movement of said assembly as a whole relative to the mold carriage; said pivoting cylinder is mounted at one end to said movable support for pivotal movement of its free end about a third axis parallel to said first two axes; and a lifting cylinder and piston is connected between said pivoting cylinder and said movable support to raise and lower the free end of said pivoting cylinder.

3. The apparatus as defined in claim 1, wherein said lever means on said mold holding portion includes latch means at the unhinged face of said portion which are engageable with said lower mold holding portion when said portions are closed and said lever means is actuated, and means for locking said latch means, said piston rod of said pivoting cylinder having a U-shaped configuration at its free end which is adapted to detachably engage said lever.

4. The apparatus as defined in claim 3, wherein said lever means is pivotally attached to said upper mold holding portion and is connected to said latch means by a bellcrank and sliding guide bar.

5. The apparatus as defined in claim 4, wherein said means for locking said latch comprises a pawl which acts by gravity to lock said latch automatically on movement of said mold holding portion to closed position.

6. The apparatus as defined in claim 1, wherein said means for retaining said mold holding assembly in inclined position is continuously adjustable from an angle of 0° to 90° relative to a carriage.

7. The apparatus as defined in claim 6, wherein a lock lever is adjustably secured on said lower mold holding portion, and a guide track is mounted along said predetermined portion of said endless track, said guide track being engaged by said lock lever with advance of a carriage therealong to maintain said mold holding assembly in inclined position after disengagement of said pivoting cylinder.

8. The apparatus as defined in claim 7 wherein a stop switch is adjustably mounted on said mold carriage for contact by said lock lever to interrupt the actuation of said pivoting cylinder when said mold assembly reaches the desired inclination.

* * * * *